United States Patent
Noh

(10) Patent No.: US 6,242,131 B1
(45) Date of Patent: Jun. 5, 2001

(54) CASE OF LITHIUM SECONDARY BATTERY BASED ON A POLYMER COATED ALUMINUM MATERIAL

(75) Inventor: Hyung-gon Noh, Seoul (KR)

(73) Assignee: Samsung SDI Co., Ltd., Kyungki-do (KR)

(*) Notice: Subject to any disclaimer, the term of this patent is extended or adjusted under 35 U.S.C. 154(b) by 0 days.

(21) Appl. No.: 09/384,978

(22) Filed: Aug. 30, 1999

(30) Foreign Application Priority Data

Aug. 29, 1998 (KR) .................................................. 98-35425

(51) Int. Cl.[7] ...................................................... H01M 2/08
(52) U.S. Cl. ............................ 429/185; 429/163; 429/176
(58) Field of Search .................................... 429/176, 213, 429/185, 163

(56) References Cited

U.S. PATENT DOCUMENTS 4,759,972 * 7/1988 Yoshiga ................................. 429/215

FOREIGN PATENT DOCUMENTS 59-173944 * 10/1984 (JP) ........................................ 429/213
2000123800 * 4/2000 (JP) ................................. H01M/2/02

* cited by examiner

Primary Examiner—Stephen Kalafut
Assistant Examiner—Mark Ruthkosky
(74) Attorney, Agent, or Firm—Leydig, Voit & Mayer, Ltd.

(57) ABSTRACT

The present invention provides a lithium secondary battery for surrounding and hermetically sealing a battery body which generates current, comprising: a first copolymer layer which is the innermost layer for surrounding and hermetically sealing the battery body and is formed of poly (ethylene-co-acrylic acid) (EAA); an aluminum (Al) layer formed on the first copolymer layer; and a first nylon layer which is the outermost layer formed on the Al layer. The case can improve the overall moldability and interlayer adhesiveness and can effectively prevent leakage of an electrolytic solution, thereby increasing the battery reliability.

7 Claims, 3 Drawing Sheets

CASE OF LITHIUM SECONDARY BATTERY BASED ON A POLYMER COATED ALUMINUM MATERIAL

BACKGROUND OF THE INVENTION

1. Field of the Invention

The present invention relates to a lithium secondary battery, and more particularly, to the case of a lithium secondary battery which hermetically seals and surrounds a battery body generating a current.

2. Description of the Related Art

As electronic devices such as camcorders, cellular phones or notebook type computers have been made smaller in size and lighter in weight, there has been considerable demand for small and lightweight secondary batteries with high energy density which can be used for these electronic devices. As such, a lithium secondary battery has been attracting attention as a high energy density battery. According to the kind of electrolyte used, a lithium secondary battery can be classified into a lithium ion battery which uses a liquid electrolyte and a lithium ion polymer battery which uses a solid electrolyte.

The lithium ion polymer battery includes a battery body for generating current, which is made by stacking a cathode, an anode and a separator. An electrode terminal serving as an electrical path to the outside is connected to the battery body. Parts of the battery body and the electrode terminal are hermetically sealed in an insulating case. The case of the lithium ion polymer battery hermetically seals the battery body such that thermal adhesive material layers, an innermost layer of the battery body, are adhered to each other.

FIG. 1 is an exploded perspective view showing an example of a conventional lithium ion polymer battery. Referring to FIG. 1, the lithium ion polymer battery includes a battery body 11 having a cathode plate, an anode plate and a separator, and a case 12 surrounding the battery body 11, heretically sealing the body. Electrode tabs 14 and 14' serving as an electrode path for inducing the current generated in the battery body 11 to the outside are installed such that a predetermined length of them is exposed outside the case material 12.

The case 12 is made of an outer material such as an insulating film having a stacked structure, as shown in FIG. 2.

Referring to FIG. 2, the outer material is formed such that a thermal adhesive material layer 21, an innermost layer of a battery body 20, has an aluminum (Al) layer 22, a polyethylene layer 23, and a polyester layer 24 sequentially deposited thereon. Here, the thermal adhesive material layer 21 is formed of SURLYN (Dupont Inc.) obtained by adding Na, K, Mg or Zn to poly(ethylene-co-acrylic acid). The Al layer 22 on the thermal adhesive material layer 21 prevents permeation of moisture and loss of an electrolytic solution. The polyethylene layer 23 strengthens the functions of an outermost layer and improves adhesiveness. The polyester layer 24, the outermost layer, protects the battery against external shock.

The case 12 formed of the above-described outer material hermetically seals the battery such that the battery body 11 is inserted into the case 12, with only parts of the electrode taps 14 and 14' being exposed, and then the case is folded in half. Then, heat and pressure are applied to the case 12 to hermetically seal the battery such that thermally adhesive materials of the edges in the upper and lower portions of the case 12 are adhered to each other.

As described above, the case is bonded by thermally adhering parts of the innermost layer surrounding the battery body 20. However, since the outer material of the conventional lithium secondary battery is relatively thin and the Al layer 22 is particularly thin, that is, about 9 $\mu$m, it is not easy to fabricate the outer material of the conventional lithium secondary battery. Also, the polyester layer 24, the outermost layer, is susceptible to defects during molding, such as cracking.

Further, in the outer material of the conventional lithium secondary battery, when the innermost layer is thermally adhered, the adhesion efficiency may be poor, depending on a slight change in processing conditions including pressure, temperature and time, which causes leakage of the electrolytic solution in the lithium secondary battery.

SUMMARY OF THE INVENTION

To solve the above problems, it is an objective of the present invention to provide a case of a lithium secondary battery having an improved reliability by enhancing its moldability.

To accomplish the above objective, the present invention provides a case of a lithium secondary battery for surrounding and hermetically sealing a battery body which generates current, comprising:

a first copolymer layer which is the innermost layer for surrounding and hermetically sealing the battery body and is formed of poly(ethylene-co-acrylic acid) (EAA);

an aluminum (Al) layer formed on the first copolymer layer; and a first nylon layer which is the outermost layer formed on the Al layer.

Here, the Al layer has a thickness of at least 50 $\mu$m. Also, a second nylon layer is further formed between the first copolymer layer and the Al layer.

According to another aspect of the present invention, a first polyethylene layer is formed between the first copolymer layer and the Al layer and a second polyethylene layer is formed between the Al layer and the first nylon layer.

According to still another aspect of the present invention, a polyethylene layer, a second nylon layer and an EAA layer are sequentially deposited between the first copolymer layer and the Al layer.

Also, the objective of the present invention can be accomplished by a case of a lithium secondary battery for surrounding and hermetically sealing a battery body which generates current, comprising:

a polypropylene layer which is the innermost layer for surrounding and hermetically sealing the battery body;

an Al layer formed on the polypropylene layer; and a polyester layer which is the outermost layer formed on the Al layer.

The case of the lithium secondary battery having the above-described layer structure employs a solid electrolyte, which obviate a possibility of electrolytic solution leakage. Thus, the case is useful for a battery which does not need to be molded.

The Al layer preferably has a thickness of 30 $\mu$m or more. An Al layer having a thickness of less than 50 $\mu$m is not preferred because the moldability of the Al layer is poor.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
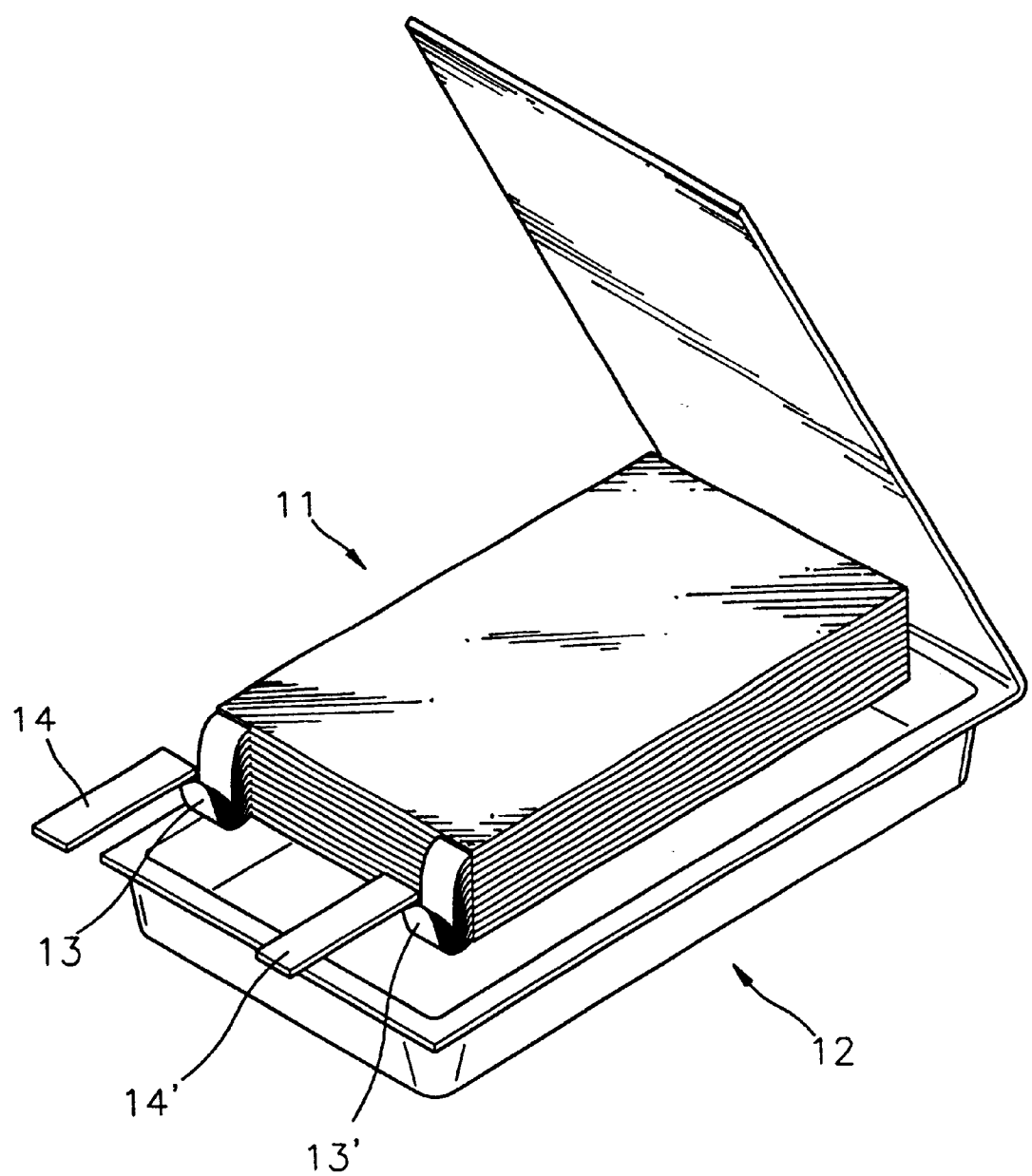
FIG. 1 is an exploded perspective view showing an example of a conventional lithium ion polymer battery.
Figure 2:
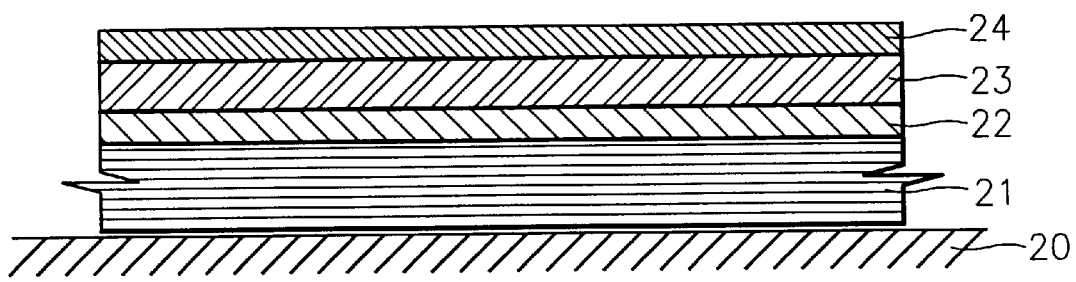
FIG. 2 is a cross-sectional view showing the case of a conventional lithium ion polymer battery.
Figure 3:
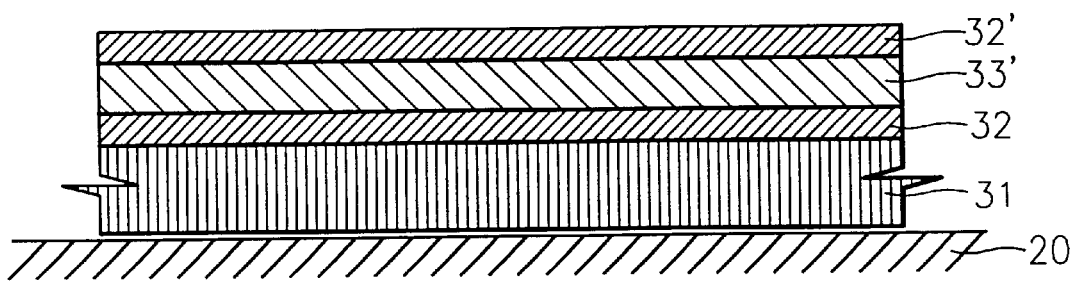
FIGS. 3 through 6 are cross-sectional views showing a case of a lithium secondary battery according to the present invention.

Referring to FIG. 3, a case of a lithium secondary battery according to the present invention is formed of a poly (ethylene-co-acrylic acid) (EAA) layer 31 as an innermost layer for surrounding and hermetically sealing a battery body 20. A first nylon layer 32, an Al layer 33' and a second nylon layer 32' are sequentially formed thereon. The case hermetically seals the battery body 20 by thermally adhering overlapping ends of the EAA layer 31 to each other.

The first nylon layer 32 increases the adhesiveness between the EAA layer 31 and the Al layer 33' and allows the Al layer 33' to be smoothly molded. The Al layer 33' prevents permeation of moisture and loss of an electrolytic solution and is formed to a thickness of at least 50 $\mu$m so as to facilitate molding of the case. If the thickness of the Al layer 33 is less than 30 $\mu$m, the moldability is unfavorably degraded.

The second nylon layer 32' as the outermost layer is a protective layer for preventing cracks from being generated on the outer surface of the battery and facilitates the molding of the case.

Preferably, the EAA layer 31 has a thickness in the range of 15 to 55 $\mu$m, the first nylon layer 32 has a thickness in the range of 15 to 25 $\mu$m, the Al layer 33 has a thickness in the range of 30 to 50 $\mu$m, and the second nylon layer 32' has a thickness in the range of 10 to 50 $\mu$m. When the respective layers have thicknesses in the above-described ranges, the battery exhibits the highest reliability.

Also, although not shown, the adhesiveness between layers can be further enhanced by interposing a polyurethane layer between the layers.

Figure 4:
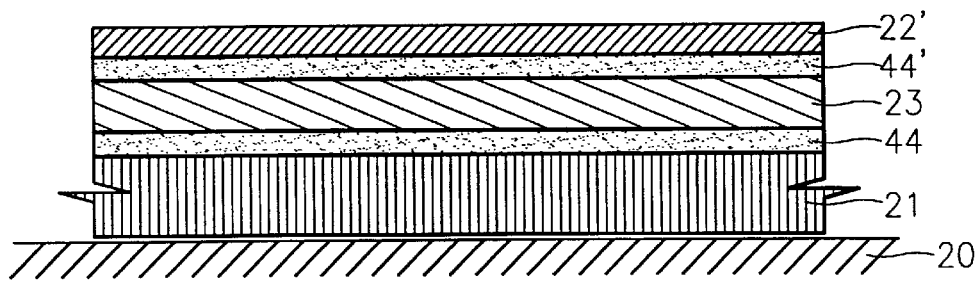
Figure 5:
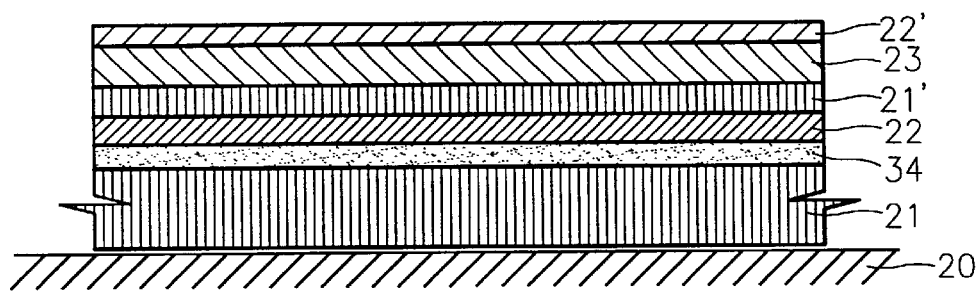

FIGS. 4 and 5 show cases according to another aspect of the present invention. Here, the same reference numerals as those of FIG. 3 denote equivalent layers.

Referring to FIG. 4, an Al layer 23 and a nylon layer 22' are deposited on an EAA layer 21 coupled to a battery 20. Also, a first polyethylene layer 44 is located between the EAA layer 21 and the Al layer 23, and a second polyethylene layer 44' is located between the Al layer 23 and the nylon layer 22'. The first and second polyethylene layers 44 and 44' increase the adhesiveness between the respective layers and facilitate molding of the Al layer 23.

Preferably, the EAA layer 21 has a thickness in the range of 20 to 45 $\mu$m, the first polyethylene layer 44 has a thickness in the range of 5 to 15 $\mu$m, the Al layer 23 has a thickness in the range of 35 to 55 $\mu$m, the second polyethylene layer 44' has a thickness in the range of 5 to 15 $\mu$m, and the nylon layer 22' has a thickness in the range of 5 to 15 $\mu$m.

Referring to FIG. 5, the case is constructed such that a polyethylene layer 34, a first nylon layer 22 and a second EAA layer 21' are sequentially arranged on a first EAA layer 21 as the innermost layer coupled to the battery body 20, for preventing leakage of an electrolytic solution and for increasing the moldability of the case.

An Al layer 23 and a second nylon layer 22' as the outermost layer are provided on the second EAA layer 21'.

In the case having the aforementioned structure, preferably, the first EAA layer 21 has a thickness in the range of 20 to 45 $\mu$m, the polyethylene layer 34 has a thickness in the range of 5 to 15 $\mu$m, the first nylon layer 22 has a thickness in the range of 5 to 15 $\mu$m, the second EAA layer 21' has a thickness in the range of 5 to 15 $\mu$m, the Al layer 23 has a thickness in the range of 30 to 50 $\mu$m, and the second nylon layer 22' has a thickness in the range of 5 to 25 $\mu$m.

Figure 6:
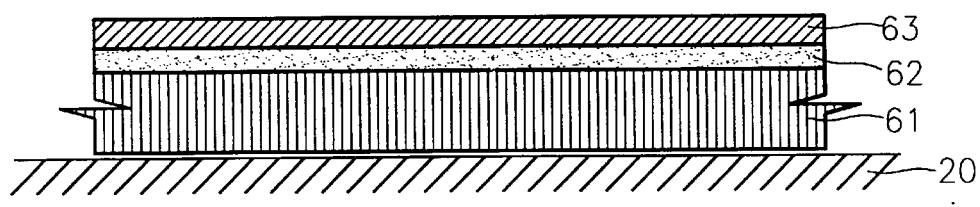

The case of the lithium secondary battery shown in FIG. 6 is preferably formed of a material for hermetically sealing a gel-type battery body employing a solid separator and a separate molding process is not necessary.

Referring to FIG. 6, the case is constructed such that an Al layer 62 and a polyester layer 63 are sequentially formed on a polypropylene layer 61 as the innermost layer coupled to the battery body 20. In particular, the polyester layer 63 is not specifically restricted but is preferably formed of polyethyleneterephthalate.

In the case having the aforementioned structure, preferably, the polypropylene layer 61 has a thickness in the range of 10 to 80 $\mu$m, the Al layer 62 has a thickness in the range of 15 to 30 $\mu$m, and the polyester layer 63 has a thickness in the range of 20 to 50 $\mu$m.

As described above, the case of the lithium secondary battery according to the present invention includes an EAA layer as the innermost layer, a nylon layer as the outermost layer, and an Al layer interposed therebetween and having a thickness of at least 50 $\mu$m. The case can improve the overall moldability and interlayer adhesion and can effectively prevent leakage of an electrolytic solution, thereby increasing the battery reliability.

Also, since the case shown in FIG. 6 hermetically seals a gel-type battery body, it is useful for a battery which does not need to be separately molded.

What is claimed is:

1. A case of a lithium secondary battery for surrounding and hermetically sealing a battery body which generates current, the case comprising:

a first copolymer layer for surrounding and hermetically sealing a battery body, the layer being poly(ethylene-co-acrylic acid) (EAA);

an Al layer on the first copolymer layer; and a nylon layers which is the outermost layer, on the Al layer.

2. The case according to claim 1, wherein the Al layer has a thickness of at least 30 $\mu$m.

3. The case according to claim 1, further comprising another nylon layer between the first copolymer layer and the Al layer.

4. The case according to claim 1, further comprising a first polyethylene layer between the first copolymer layer and the Al layer and a second polyethylene layer between the Al layer and the nylon layer.

5. The case according to claim 1, wherein a polyethylene layer, another nylon layer and an EAA layer, are sequentially arranged between the first copolymer layer and the Al layer.

6. A case of a lithium secondary battery for surrounding and hermetically sealing a battery body which generates current, the case comprising:

a polypropylene layer for surrounding and hermetically sealing a battery body;

an Al layer on the polypropylene layer; and a polyethyleneterephthalate layer, the outermost layer, on the Al layer.

7. The case according to claim 6, wherein the Al layer has a thickness in a range of 5 to 30 $\mu$m.

* * * * *